United States Patent
Adams et al.

(10) Patent No.: US 12,174,677 B2
(45) Date of Patent: Dec. 24, 2024

(54) DYNAMIC CONTROL FOR FAN SPEED DURING SYSTEM BOOT AND REBOOT IN HOT AND COLD ENVIRONMENTS

(71) Applicant: ZT GROUP INT'L, INC., Secaucus, NJ (US)

(72) Inventors: Christopher Adams, Hoboken, NJ (US); Sruti Chigullapalli, Seattle, WA (US); Son Lam, Tacoma, WA (US)

(73) Assignee: ZT GROUP INT'L, INC., Secaucus, NJ (US)

( * ) Notice: Subject to any disclaimer, the term of this patent is extended or adjusted under 35 U.S.C. 154(b) by 0 days.

(21) Appl. No.: 18/363,245

(22) Filed: Aug. 1, 2023

(65) Prior Publication Data
US 2023/0376088 A1 Nov. 23, 2023

Related U.S. Application Data

(63) Continuation of application No. 17/572,226, filed on Jan. 10, 2022, now Pat. No. 11,762,438.

(51) Int. Cl.
*G06F 1/20* (2006.01)
*G05B 15/02* (2006.01)
*G06F 9/4401* (2018.01)

(52) U.S. Cl.
CPC ............... *G06F 1/20* (2013.01); *G05B 15/02* (2013.01); *G06F 1/206* (2013.01); *G06F 9/4401* (2013.01)

(58) Field of Classification Search
USPC ....................................................... 700/300
See application file for complete search history.

(56) References Cited

U.S. PATENT DOCUMENTS

| | | | | |
|---|---|---|---|---|
| 10,585,466 | B1* | 3/2020 | Lin | G05B 17/02 |
| 2004/0050076 | A1* | 3/2004 | Palfy | G05D 22/02 |
| | | | | 62/3.4 |
| 2012/0084551 | A1* | 4/2012 | Cheng | G06F 1/206 |
| | | | | 713/300 |
| 2012/0268051 | A1* | 10/2012 | Wu | F04D 27/004 |
| | | | | 318/472 |
| 2015/0124390 | A1* | 5/2015 | Koch | G06F 1/1633 |
| | | | | 361/679.55 |
| 2017/0318708 | A1* | 11/2017 | Shabbir | G05B 15/02 |

FOREIGN PATENT DOCUMENTS

CN 101751092 A * 6/2010

OTHER PUBLICATIONS

Chen et al., "Improvement of a High-Current-Density Power Backplane Design With a PID Fan Control Cooling System on an Enterprise Server" IEEE Canadian Journal of Electrical and Computer Engineering (vol. 44, Issue: 1), Feb. 18, 2021, pp. 1-9 (Year: 2021).*

* cited by examiner

*Primary Examiner* — Emilio J Saavedra
(74) *Attorney, Agent, or Firm* — POLSINELLI PC

(57) ABSTRACT

A method is provided for dynamically controlling fan speed of a computing system during boot and reboot. The method may include receiving an ambient temperature from a sensor by a controller. The method may also include controlling speed for one or more fans dynamically based upon the ambient temperature using a dynamic algorithm during boot and reboot of the computing system. The dynamic algorithm may include a function for the fan speed of the one or more fans based upon the ambient temperature.

20 Claims, 7 Drawing Sheets

DYNAMIC CONTROL FOR FAN SPEED DURING SYSTEM BOOT AND REBOOT IN HOT AND COLD ENVIRONMENTS

CROSS REFERENCE TO RELATED APPLICATIONS

This application is a continuation of U.S. patent application Ser. No. 17/572,226, entitled "DYNAMIC CONTROL FOR FAN SPEED DURING SYSTEM BOOT AND REBOOT IN HOT AND COLD ENVIRONMENTS," filed on Jan. 10, 2022, which is incorporated herein in its entirety.

FIELD

The disclosure is directed to methods for controlling pulse-width-modulation (PWM) fans during boot and reboot in hot and cold environments.

BACKGROUND

Telecommunication service providers deploy 5G equipment or servers in rugged environments. Network Equipment Building System (NEBS) standard contains industry requirements for reliable electronics in telecommunication applications and very hot and cold environments for electronic systems. NEBS systems may operate in an environment having temperatures ranging from −5° C. to 55° C. at an elevation of 6000 ft for a short term, such as four days. The NEBS systems may also operate 24 hours seven days each week.

Service providers may install NEBS systems during inclement weather events, such as a summer heatwave or an adverse winter weather event (e.g. storm or blizzard), or during a failure of the environmental control of the system housing (e.g. air conditioning unit failure). Support in cold and hot environments (e.g. −5° C. to 55° C.) means powering the NEBS SYSTEM or rebooting while the air temperature is between −5° C. to 55° C. Fan speeds need to be controlled to cool the NEBS systems adequately during boot or reboot at high-temperatures (e.g. 55° C.) and may also be controlled not to cool the components too much during boot/reboot at low-temperatures (e.g. −5° C.).

Pulse-width modulation (PWM) fans are DC fans with an extra wire for PWM. PWM fans are 4-pin fans where the fourth wire sends a PWM signal to the fan motor, with the other three pins being power supply, ground and tachometer (fan speed) output. The PWM signal is the control input of the PWM fan. The PWM signal is a high frequency square wave that varies between 0 V and the power supply voltage. The duty cycle represents the percentage of the signal at the power supply voltage. The duty cycle of the PWM signal controls the speed of the fan motor. The average value of voltage (and current) of the PWM signal fed to the fan motor is controlled by turning the switch between supply and load on and off at a fast rate. The longer the switch is on compared to the off periods, the higher the total power supplied to the load.

Most conventional NEBS systems are automatically set to 100% fan speed during system boot or reboot. There remains a need for improving fan power control during system start-up and reboot.

BRIEF SUMMARY

In one aspect, a method is provided for dynamically controlling the fan power of a computing system during start-up and reboot. The method may include receiving an ambient temperature from a sensor by a controller. The method may also include controlling power for one or more fans dynamically based upon the ambient temperature using a dynamic algorithm during the start-up and reboot of the computing system. The dynamic algorithm may include a function for the fan power of one or more fans based upon the ambient temperature.

In another aspect, a system may include a storage device configured to store instructions; a processor configured to execute the instructions and cause the processor to receive an ambient temperature from a sensor by a controller, and control power for one or more fans dynamically based upon the ambient temperature using a dynamic algorithm during start-up and reboot of the computing system. The dynamic algorithm may include a function for the fan power of the one or more fans based upon the ambient temperature.

In a further aspect, a non-transitory computer-readable medium may include instructions, the instructions, when executed by a computing system, cause the computing system to receive an ambient temperature from a sensor by a controller; and control power for one or more fans dynamically based upon the ambient temperature using a dynamic algorithm during start-up and reboot of the computing system. The dynamic algorithm may include a function for the fan power of the one or more fans based upon the ambient temperature.

Additional aspects, embodiments, and features are outlined in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which form a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The disclosure may be understood by reference to the following detailed description, taken in conjunction with the drawings as described below. It is noted that, for purposes of illustrative clarity, certain elements in various drawings may not be drawn to scale.

The NEBS systems may handle negative ambient temperatures, such that the fans may get damaged. Also, telecommunication service providers desire to reduce system power during start-up or reboot for power savings. There are also concerns about condensation and corrosion when installing a cold server into a warm cabinet. There are also concerns that the fan must be run at high enough power to ensure that the system components and structural members do not overheat.

The disclosure addresses the issues and provides a method that controls the power of PWM fans during start-up and reboot based upon ambient conditions, and not based upon a set value as the conventional method. The disclosed method uses a dynamic algorithm for controlling the fan PWM during system boot or reboot. The dynamic algorithm is based upon a polynomial function varying with ambient temperatures. The polynomial function may vary with a particular computing system, such as servers or NEBS systems. In the disclosure, system start-up may also be referred to as system boot.

The implementation of the dynamic algorithm for fan PWM during start-up and reboot can result in fan power saving, condensation or corrosion protection, and overheating protection in the 5G Far Edge uncontrolled environment.

Figure 1:
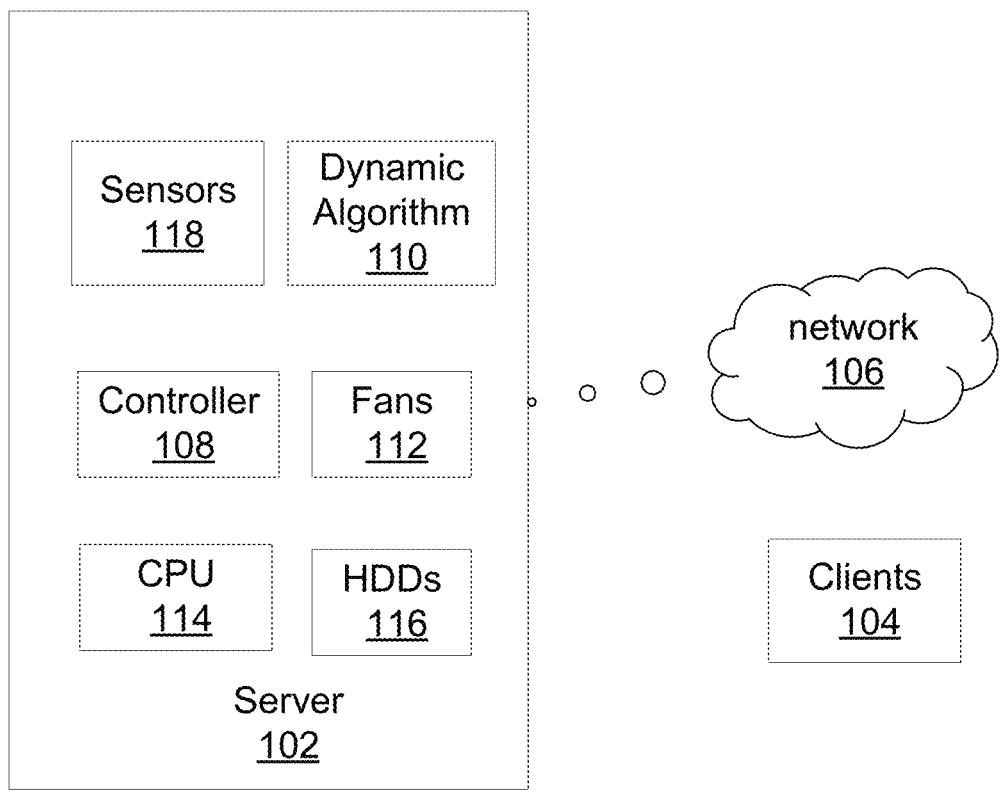
FIG. 1 is a diagram of a server system according to an embodiment of the disclosure.

FIG. 1 is a diagram of a server system according to an embodiment of the disclosure. A computing system 102 (e.g. server or NEBS system) is in communication with client 104 over a network 106. The computing system 102 includes a central processing unit (CPU) 114, HDDs 116, controller 108, and fans 112 that is controlled by controller 108 using a dynamic algorithm 110 to cool the CPU 114 or hard disk drives (HDDs) 116. The computing system 102 may also include, but not limited to, CPU, hard disk drives (HDDs), steady state drives (SSDs), dual in-line memory modules (DIMMs) or commonly known as ram sticks, network interface cards, PCIe add-on acceleration cards, voltage regulators, chassis handles and structural elements.

In some variations, the computing system 102 may be a server that includes multiple SSDs. The servers are computers or systems that provide resources, data, services, or programs to other computers over a network. The servers may be used to help cloud providers with hyper-scale and edge computing applications. A single server can serve multiple clients, or a single client can use multiple servers. Typical servers are database servers, file servers, mail servers, print servers, web servers, game servers, telecommunication servers, and application servers. Servers are often housed in cabinet enclosures or mounted in racks. In some variations, the servers may be NEBS systems.

In some variations, controller 108 may be a baseboard management controller (BMC).

In some variations, fans 112 may be pulse width modulation (PWM) fans. PWM fans are often used for cooling hard disk drives (HDDs), and other electrical and structural components, in servers. During system boot and reboot, some system sensors may not be fully functional, requiring a different fan speed control method than typical system functioning where sensors are fully functional. A conventional fan speed control methodology during system boot and reboot is to keep the fan speed very high regardless of the current ambient conditions, to cool the system in the event of high ambient temperature conditions.

The PWM fan speed or power is often represented by fan duty cycles. PWM works lke a switch, turning on and off the fans while controlling the level of power delivered to the fans. PWM fans work with motors, receiving full power or zero power. For example, PWM fans may have a duty cycle of 100% at which the fan is in full power. PWM fans may have a duty cycle of 95% at which the fan has lower power than the duty cycle of 100%. Likewise, the PWM fans may have a duty cycle of 90%, 85%, etc., among others.

In some variations, the fans may be DC fans. The fan speed can be controlled by the dynamic algorithm 110.

Controller 108 also includes sensors 118 for detecting ambient temperatures or environment temperatures, humidity, and/or pressure, among others. Various sensors are commercially available. Some sensors may measure pressure, temperature, humidity. Some sensors may measure temperature and humidity. Some sensors may measure pressure.

To support start-up and reboot in ambient temperatures from −5° C. to 55° C., the dynamic algorithm 110 including a polynomial function is implemented for dynamically controlling PWM fans 112. BMC 108 uses sensors 118, such as an ambient temperature sensor, a relative humidity sensor, and a pressure sensor, to measure the ambient temperature, relative humidity, and/or pressure, which can be used as input to BMC 108, to control fan speeds or power during boot up or reboot.

The polynomial function is represented by Equation (1) as follows:

$$\text{Boot PWM (\%)} = A*\text{AMBIENT}^3 + B*\text{AMBIENT}^2 + C*\text{AMBIENT} + D \qquad \text{Eq. (1)}$$

Where A, B, C, and D are constants, and PWM ranges from 1% to 100%. AMBIENT above represents ambient temperatures measured by the sensor on the BMC. A dew point may be calculated by using the correlation of temperature, pressure, and relative humidity (RH).

The dynamic algorithm 110 can choose which constants to use if the ambient temperature is near the dew point. The dew point is the temperature to which the air needs to be cooled at a constant pressure to achieve an RH of 100%, at which point condensation is likely on surfaces at or below the dew point temperature. Condensation can damage electrical and structural system components, and consequently is desirable to keep surface temperatures above the dew point. If the ambient temperature is greater than the dew point, the dynamic algorithm uses A, B, C, D. If the ambient temperature is lower than the dew point, the dynamic algorithm uses $A_{dew}$, $B_{dew}$, $C_{dew}$, $D_{dew}$. The $A_{dew}$, $B_{dew}$, $C_{dew}$, $D_{dew}$ are lower than constants A, B, C, D, and thus reduce airflow to increase surface temperatures, and also reduce the risk of condensation.

The fan power can be reduced during boot/reboot by using the polynomial function. Additionally, computing system 102 (e.g. server or NEBS SYSTEM) may resume typical operation when the system has exited the boot/reboot state. BMC 108 may switch from the dynamic algorithm for controlling PWM during start-up and reboot to a regular fan speed control when the boot/reboot Power-On Self-Test (POST) is completed. For example, the BMC receives a signal indicating the system exits POST and initiates operating system (OS) boot. At the end of POST, all system sensors start functioning and the fan can have regular fan speeds.

At very hot or cold ambient temperatures (e.g. greater than 55° C. or lower than −40° C.), some components may approach their temperature specification limits. The system may be shut down to ensure components do not overheat and to avoid damage to the system. The system may resume operation when ambient conditions return to acceptable conditions.

There are several benefits for implementing the dynamic algorithm. The dynamic algorithm allows system components to stay within the allowed temperature range. The dynamic algorithm also helps reduce possible condensation in the server due to overcooling at low ambient temperature. The dynamic algorithm also allows an ambient temperature-based-boot or reboot. The implementation of the dynamic algorithm in the system reduces fan power during start-up and reboot and thus reduces customer operation expenses.

The benefits also include improving fan reliability by reducing fan speed/temperature/power gradients during start-up and reboot. The ambient temperature-based boot and start fan speed control can protect components at high and low-temperatures. The benefits further include removing unnecessary low-temperature errors during start-up and reboot at low ambient in operations.

Figure 2:
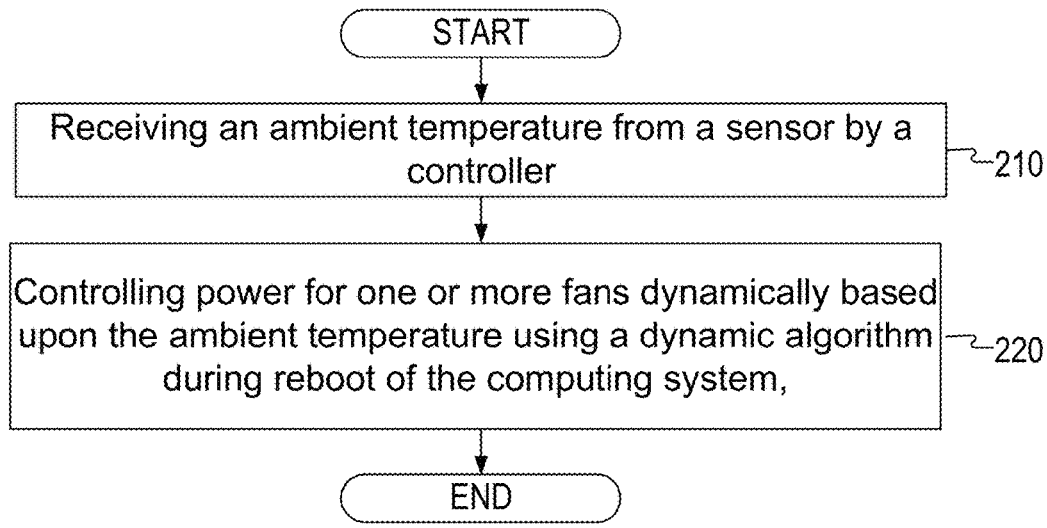
FIG. 2 is a flow chart for dynamically controlling fan power of a computing system during start-up and reboot according to an embodiment of the disclosure.

FIG. 2 is a flow chart for dynamically controlling the fan power of a computing system during start-up and reboot according to an embodiment of the disclosure. Although example method 200 depicts a particular sequence of operations, the sequence may be altered without departing from the scope of the present disclosure. For example, some of the operations depicted may be performed in parallel or in a different sequence that does not materially affect the function of method 200. In other examples, different components of an example device or system that implements method 200 may perform functions at substantially the same time or in a specific sequence.

According to some examples, method 200 includes receiving an ambient temperature from a sensor by a controller at block 210. For example, controller 108 illustrated in FIG. 1 may receive an ambient temperature from sensor 118.

In some variations, the sensor may include a temperature sensor, a relative humidity sensor, a pressure sensor, or a combination.

In some variations, the ambient temperature ranges from −5° C. to 55° C.

In some variations, the ambient temperature ranges from −5° C. to 50° C.

In some variations, the ambient temperature is less than −5° C.

In some variations, the ambient temperature is greater than 55° C.

In some variations, the ambient temperature is in the range of less than −5° C. to greater than 55° C.

In some variations, the controller is a baseboard management controller (BMC).

According to some examples, method 200 includes controlling power for one or more fans dynamically based upon the ambient temperature using a dynamic algorithm during the start-up and reboot of the computing system at block 220. For example, controller 108 illustrated in FIG. 1 may control power for one or more fans 112 dynamically based upon the ambient temperature using a dynamic algorithm during start-up and reboot of the computing system 102. The dynamic algorithm 110 may include a function for the fan power of the one or more fans based upon the ambient temperature.

In some variations, the one or more fans may include pulse-width-modulation (PWM) fans.

In some variations, the algorithm for dynamic control of PWM fans during start-up and reboot, the ambient temperatures are based upon measured temperature values, such as inlet temperature near system inlet, represented by INLET, from the sensor using a polynomial function as follows:

$$\text{Boot\_PWM (\%)} = A*\text{INLET}^3 + B*\text{INLET}^2 + C*\text{INLET} + D,$$

where A,B,C,D are user defined.

To ensure that the Boot_PWM (%) is not less than 1, the following check also occurs. IF INLET<=0, THEN Boot_PWM (%)=1.

It will be appreciated by those skilled in the art that the dynamic algorithm can be implemented in any server or computing system that is used in hot or cold environments. A, B, C, D may vary with the computing systems.

In some variations, the computing system is a NEBS system. The implementation of the dynamic algorithm is particularly helpful for the NEBS system that may be exposed to negative temperatures, where setting the fan PWM to be full power may cause damage to the NEBS system. The dynamic algorithm allows to safely boot the NEBS system in both high and low-temperature environments in which the NEBS system may operate.

Example

The following examples are for illustration purposes only. It will be apparent to those skilled in the art that many modifications, both to materials and methods, may be practiced without departing from the scope of the disclosure.
Experiments for Server System Including Baseboard Management Controller (BMC)

Figure 3A:
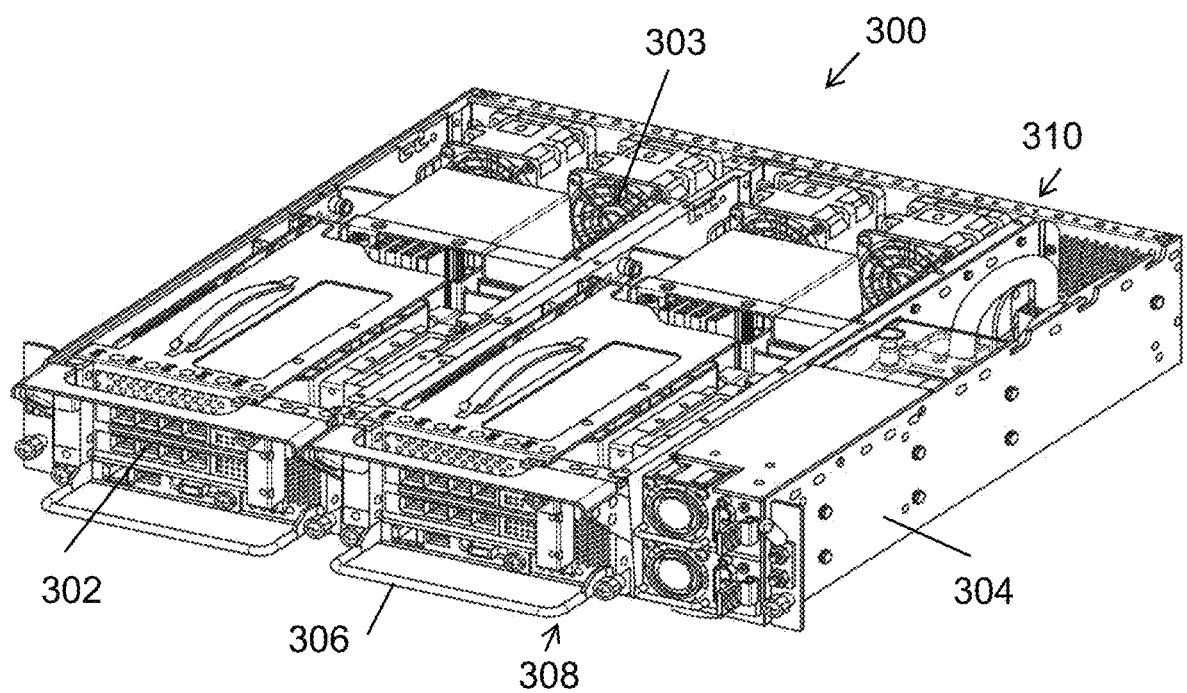
FIG. 3A is a perspective view of an example server system that may operate in extreme ambient temperatures according to an embodiment of the disclosure.

FIG. 3A is a perspective view of a server system that may operate in extreme ambient temperatures according to an embodiment of the disclosure. As illustrated, a server system 300 includes network interface cards (NICs) 302, which may be placed on a chassis 304 or a rack that holds one or more servers. The server node 308 also includes PWM fans 303 or 310.

Figure 3B:
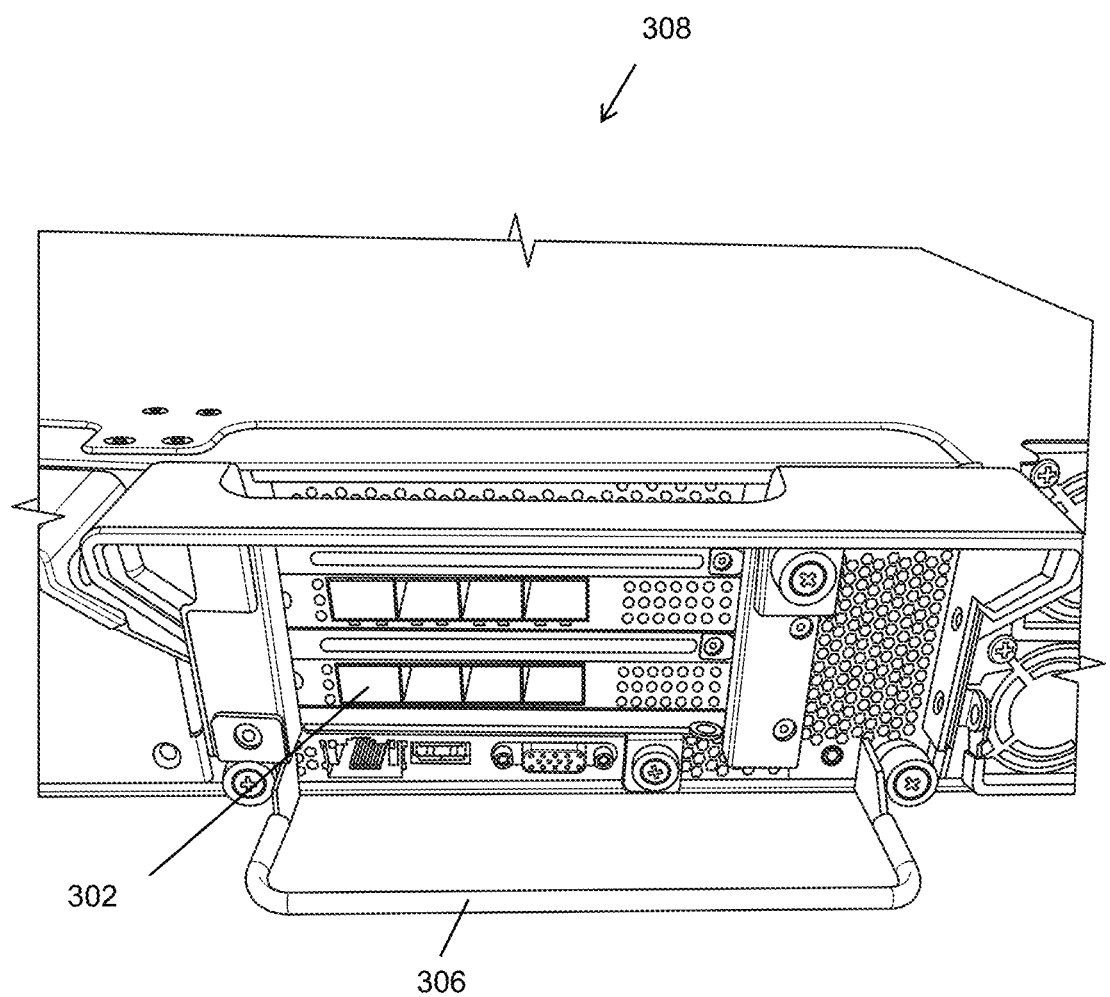
FIG. 3B is a view of the front of the server node of the server system of FIG. 3A according to an embodiment of the disclosure.

FIG. 3B is a view of frontside of the server node 308 of the server system of FIG. 3A according to an embodiment of the disclosure. As illustrated, the server node 308 including NICs 302 can be pulled out by using handle 306.

BMC is a service processor that monitors the physical state of a computer, network server, or other hardware device using sensors and communicating with the system administrator through an independent connection. The BMC is placed on a motherboard for the server.

Figure 3C:
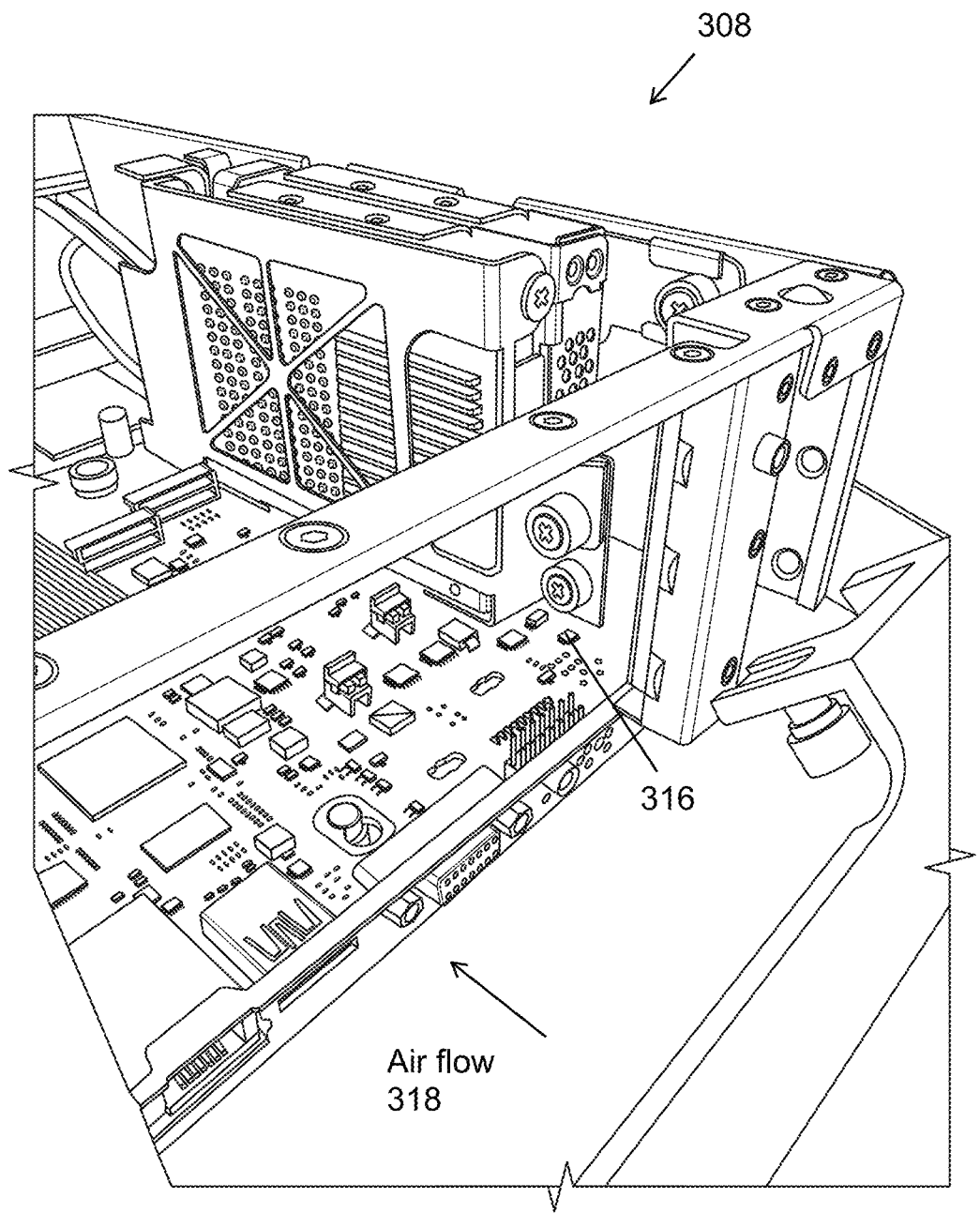
FIG. 3C is a perspective view inside the server system of FIG. 3B including a controller according to an embodiment of the disclosure.

FIG. 3C is a perspective view inside the server node of FIG. 3B including a controller according to an embodiment of the disclosure. Sensors 316 may be positioned at the front of the server node 308 and can measure the inlet airflow-temperature. Arrow 318 represents an airflow direction into the server system 300. Sensors 316 can be placed near an outer edge of the server node 308, close to region that airflow enters the system, to measure the ambient temperature. Sensors 316 may also be able to measure relative humidity and pressure. It will be appreciated by those skilled in the art that other sensors, such as relative humidity sensors or pressure sensors may be placed in the system. Sensors for reading temperature, humidity, and pressure may also be placed in other positions within the system to read local ambient temperatures.

To obtain the polynomial function, experiments can be performed for the server system 300. Desired boot and reboot PWMs can be obtained at various ambient temperatures measured by sensors 316. Typically, a user may test the server system at a representative set of ambient temperatures spanning the range in which the server system can support start-up and reboot. At each of the ambient temperatures, the user may configure the server system to a similar functional state to the one the server system will be in during start-up and reboot. The user then varies the power or speed of fans (or individual fans) until all system components and structural members temperatures are in the desired ranges, which may be determined based upon vendor specifications and/or internal specifications. The acceptable fan speed/power value may be recorded at each of the ambient temperatures, and A,B,C,D, parameters can be obtained by curve fitting to match the desired power or speed values from testing. The tests may be repeated under various pressures and various humidity values to determine the Adew, Bdew, Cdew, Ddew coefficients. During the experiments, dew point and ambient temperatures can also be monitored by sensors 316 or other sensors such as relative humidity sensors or pressure sensors. Then, a curve fitting to experimental data including desired boot and reboot PWMs versus ambient temperatures yields the polynomial function.

Table 1 lists the thermocouple temperature for the calibration purpose of the inlet sensor temperature. Actual boot and reboot PWM is 1% at an inlet sensor temperature of $-2°$ C., $-1°$ C., and $0°$ C., and an expected boot and reboot PWM is 1.0% according to the dynamic algorithm. Desired boot and reboot PWMs are 4%, 20%, 32%, 53%, and 94% at an inlet sensor temperature of $1°$ C., $7°$ C., $26°$ C., $46°$ C., and $56°$ C., respectively. Expected boot and reboot PWMs according to the dynamic algorithm corresponding to desired boot and reboot PWMs are 4.5%, 20.2%, 33.5%, 53.8%, and 94.0% at the same ambient temperatures, which are very close to the desired boot and reboot PWMs. The PWM % and ambient temperatures in Table 1 are also plotted in FIG. 4.

TABLE 1

Boot and reboot PWM Versus Inlet Ambient Temperature

| Thermocouple Temperature (° C.) | Inlet Sensor Temperature (° C.) | Boot and reboot PWM (%) | Expected Boot and reboot PWM (%) |
|---|---|---|---|
| −7 | −2 | 1 | 1.0 |
| −6 | −1 | 1 | 1.0 |
| −5 | 0 | 1 | 1.0 |
| −4 | 1 | 4 | 4.5 |
| 5 | 7 | 20 | 20.2 |
| 25 | 26 | 32 | 33.5 |
| 45 | 46 | 53 | 53.8 |
| 55 | 56 | 94 | 94.0 |
| 57 | 58 | 100 | 100.0 |

Figure 4:
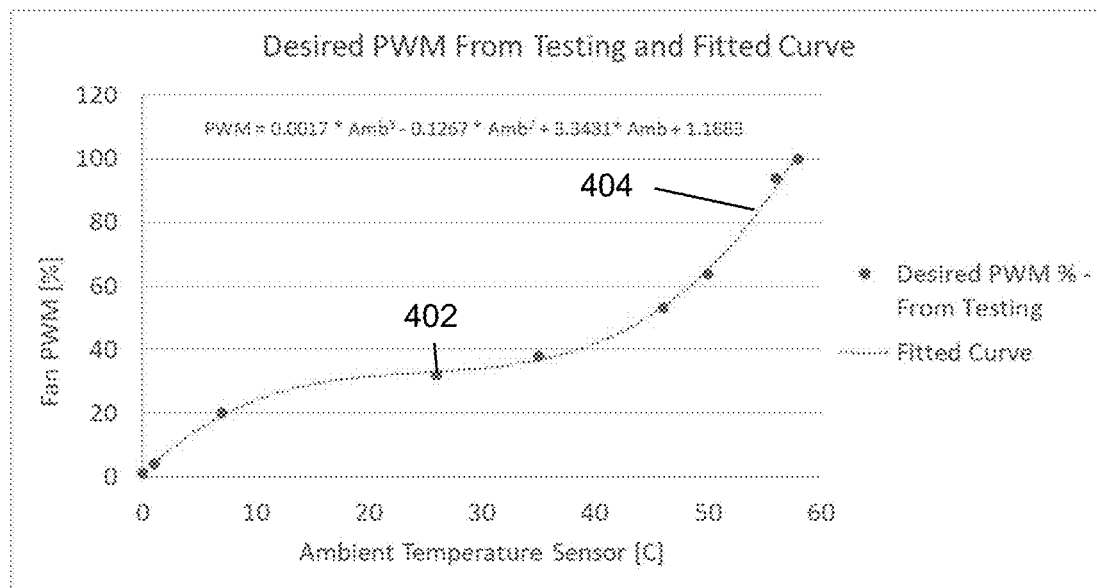
FIG. 4 illustrates desired PWM % versus ambient temperatures and a fitted curve according to an embodiment of the disclosure.

FIG. 4 illustrates desired boot and reboot fan PWM % versus ambient temperatures and a fitted curve according to an embodiment of the disclosure. As shown in FIG. 4, dots 402 represent desired boot and reboot PWM values in %, e.g. desired boot and reboot PWM %, during bootup, and were determined through the experiments.

Curve 404 represents the fitted curve to dots 402. The fitted curve 404 can be represented by a third-order polynomial in Equation (1). The third-order polynomial equation provides flexibility to get differently shaped curves. A, B, C, D constants are obtained from the fitting.

Implementation of Dynamic Algorithm for Control of Fan Power During Boot and Reboot An example is provided to compare a conventional method of Constant PWM fan power versus the disclosed Dynamic control of PWM fan power at ambient temperatures from $5°$ C. to $55°$ C. The dynamic control of PWM fan power is obtained by implementing the dynamic algorithm, which can result in power saving.

Table 2 lists various ambient temperatures including $5°$ C., $25°$ C., $45°$ C., and $55°$ C. Constant PWM fan power was 76 Watt (W) at these ambient temperatures. However, the dynamic algorithm only controls the PWM fan power to be 76 W at $55°$ C. and controls the PWM fan power to be lower than the constant power of 76 W at ambient temperatures lower than $55°$ C. Specifically, the dynamic PWM fan power values are 13 W, 15 W, and 24 W at $5°$ C., $25°$ C., and $45°$ C., respectively, which correspond to power savings of 83%, 80%, and 68% at $5°$ C., $25°$ C., and $45°$ C., respectively. The ambient temperatures and the PWM fan power in Table 2 are also plotted in FIG. 5.

TABLE 2

Boot and Reboot Fan Power Saving

| Ambient Temperature (° C.) | Constant PWM Fan Power (W) | Dynamic PWM Fan Power (W) | Power Savings (%) |
|---|---|---|---|
| 5 | 76 | 13 | 83 |
| 25 | 76 | 15 | 80 |
| 45 | 76 | 24 | 68 |
| 55 | 76 | 76 | 0 |

Figure 5:
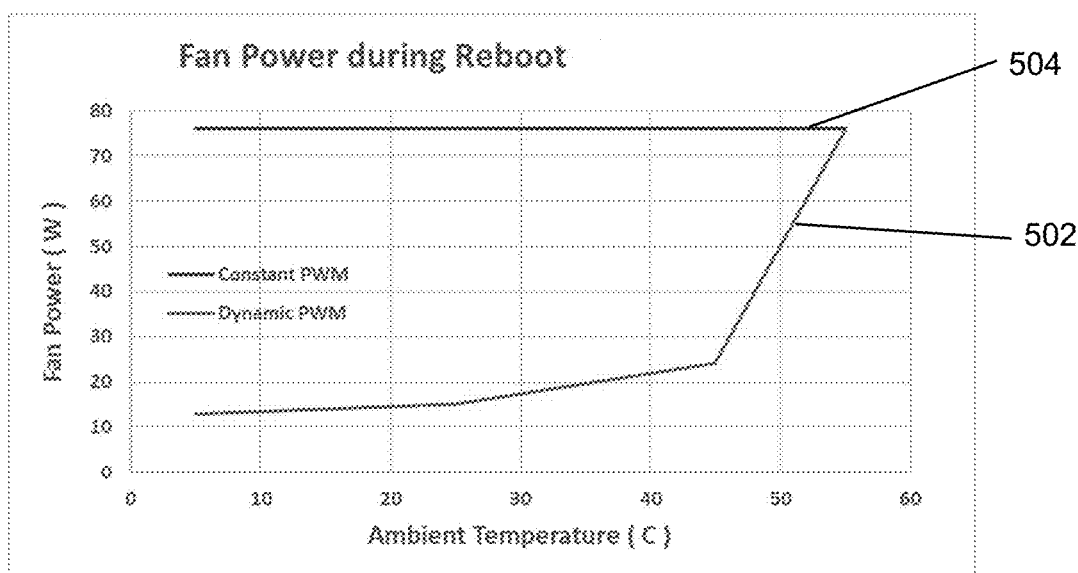
FIG. 5 illustrates dynamic control of fan power versus ambient temperatures during start-up and reboot according to an embodiment of the disclosure.

FIG. 5 illustrates dynamic control of fan power during boot and reboot versus ambient temperatures according to an embodiment of the disclosure. Curve 502 represents dynamic control of PWM power. Curve 504 represents constant PWM power. Conventionally, the PWM power during boot and reboot is defined as a set value based on high-temperature requirements of the server (100%) in the BMC. As illustrated in FIG. 5, power saving is more at lower ambient temperatures than an upper-temperature limit, e.g. $55°$ C.

Figure 6:
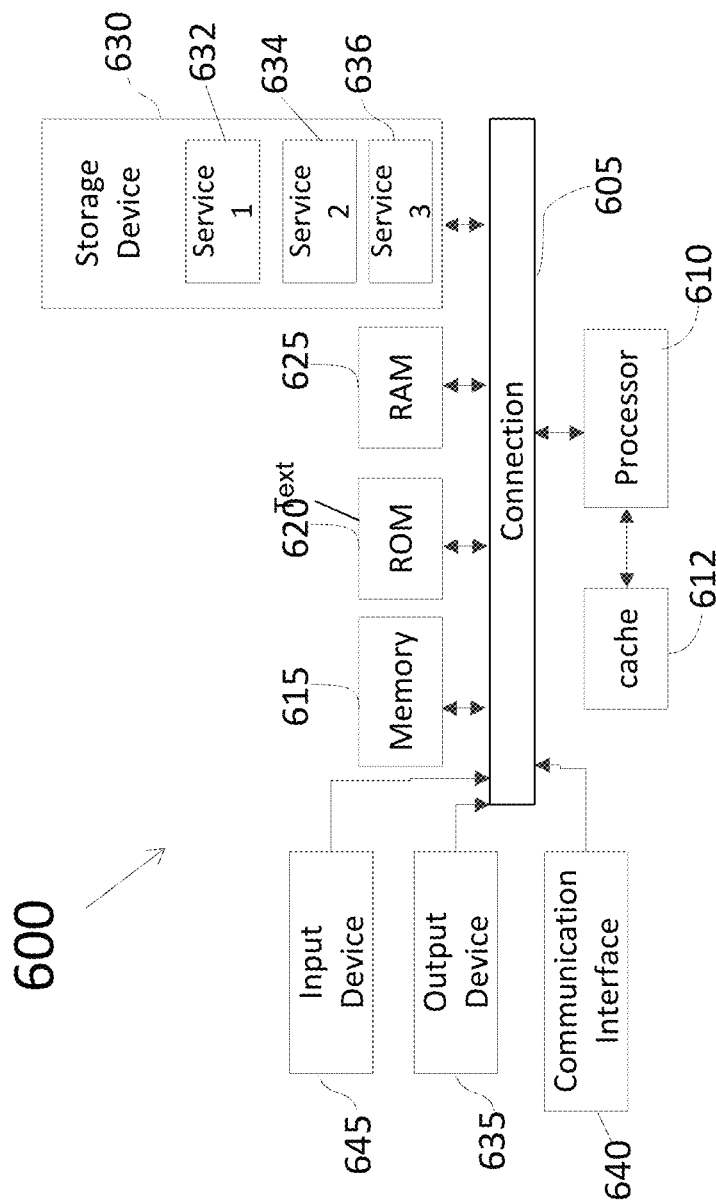
FIG. 6 shows the logical representation of a system for implementing certain aspects of the present technology.

FIG. 6 shows an example of computing system 600, which can be for example any computing device making up the NEBS system or any component thereof in which the components of the NEBS system are in communication with each other using connection 605. Connection 605 can be a physical connection via a bus, or a direct connection into processor 610, such as in a chipset architecture. Connection 605 can also be a virtual connection, a networked connection, or a logical connection.

In some embodiments, computing system 600 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Computing system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, close to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer-readable media which can store data that are accessible by a computer, such as magnetic cassettes, flash memory cards, solid-state memory devices, digital versatile disks, cartridges, random access memories (RAMs), read-only memory (ROM), and/or some combination of these devices.

The storage device 630 can include software services, servers, services, etc., and when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can include, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can include hardware, firmware, and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Having described several embodiments, it will be recognized by those skilled in the art that various modifications, alternative constructions, and equivalents may be used without departing from the spirit of the invention. Additionally, some well-known processes and elements have not been described to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A method for dynamically controlling fan speed of a computing system during boot and reboot, the method comprising:
   receiving an ambient temperature from a sensor by a controller; and
   controlling fan speed for one or more fans dynamically based upon the ambient temperature using a dynamic algorithm during boot and reboot of the computing system, wherein the dynamic algorithm comprises a function for the fan speed of the one or more fans based upon the ambient temperature, wherein the function varies with a condition that the ambient temperature is above or at or below a dew point such that the one or more fans can produce reduced airflow to avoid condensation if the ambient temperature is at or below the dew point.

2. The method of claim 1, wherein the sensor comprises a temperature sensor, a relative humidity sensor, a pressure sensor, or a combination.

3. The method of claim 1, wherein the ambient temperature is in the range of less than −5° C. to greater than 55° C.

4. The method of claim 1, wherein the controller is a baseboard management controller (BMC).

5. The method of claim 1, wherein the computing system is a network equipment building system (NEBS) system.

6. The method of claim 1, wherein the one or more fans comprise pulse-width-modulation (PWM) fans.

7. The method of claim 1, wherein the function is a third-order polynomial function represented by Boot_PWM (%)=A*AMBIENT$^3$+B*AMBIENT$^2$+C*AMBIENT+D, wherein Boot_PWM (%) represents duty cycle of PWM fans in percentage, AMBIENT represents the ambient temperature measured by the sensor, and A, B, C, and D are constants if the ambient temperature is higher than the dew point, or wherein the function is a third-order polynomial function represented by Boot_PWM (%)=A$_{dew}$*AMBIENT$^3$+B$_{dew}$*AMBIENT$^2$+C$_{dew}$*AMBIENT+D$_{dew}$ if the ambient temperature is at or lower than the dew point, wherein constants A$_{dew}$, B$_{dew}$, C$_{dew}$, D$_{dew}$ have lower values than constants A, B, C, D to reduce airflow and thus the risk of condensation.

8. A system comprising:
a storage device configured to store instructions;
a processor configured to execute the instructions and cause the processor to:
receive an ambient temperature from a sensor by a controller; and
control fan speed for one or more fans dynamically based upon the ambient temperature using a dynamic algorithm during boot and reboot of the computing system to keep the surface temperature of the computing system above a dew point, wherein the dynamic algorithm comprises a function for the fan speed of the one or more fans based upon the ambient temperature, wherein the function varies with a condition that the ambient temperature is above or at or below a dew point such that the one or more fans can produce reduced airflow to avoid condensation if the ambient temperature is at or below the dew point.

9. The system of claim 8, wherein the sensor comprises a temperature sensor, a relative humidity sensor, a pressure sensor, or a combination.

10. The system of claim 8, wherein the ambient temperature is in the range of less than −5° C. to greater than 55° C.

11. The system of claim 8, wherein the controller is a BMC.

12. The system of claim 8, wherein the computing system is a NEBS system.

13. The system of claim 8, wherein the one or more fans comprise PWM fans.

14. The system of claim 8, wherein the function is a third-order polynomial function represented by Boot_PWM (%)=A*AMBIENT$^3$+B*AMBIENT$^2$+C*AMBIENT+D, wherein Boot_PWM (%) represents duty cycle of PWM fans in percentage, AMBIENT represents the ambient temperature measured by the sensor, and A, B, C, and D are constants if the ambient temperature is higher than the dew point, or wherein the function is a third-order polynomial function represented by Boot_PWM (%)=A$_{dew}$*AMBIENT$^3$+B$_{dew}$*AMBIENT$^2$+C$_{dew}$*AMBIENT+D$_{dew}$ if the ambient temperature is at or lower than the dew point, wherein constants A$_{dew}$, B$_{dew}$, C$_{dew}$, D$_{dew}$ have lower values than constants A, B, C, D to reduce airflow and thus the risk of condensation.

15. A non-transitory computer-readable medium comprising instructions, the instructions, when executed by a computing system, cause the computing system to:
receive an ambient temperature from a sensor by a controller; and
control fan speed for one or more fans dynamically based upon the ambient temperature using a dynamic algorithm during boot and reboot of the computing system to keep the surface temperature of the computing system above a dew point, wherein the dynamic algorithm comprises a function for the fan speed of the one or more fans based upon the ambient temperature, wherein the function varies with a condition that the ambient temperature is above or at or below a dew point such that the one or more fans can produce reduced airflow to avoid condensation if the ambient temperature is at or below the dew point.

16. The computer-readable medium of claim 15, wherein the sensor comprises a temperature sensor, a relative humidity sensor, a pressure sensor, or a combination.

17. The computer-readable medium of claim 15, wherein the ambient temperature is in the range of less than −5° C. to greater than 55° C.

18. The computer-readable medium of claim 15, wherein the controller is a BMC.

19. The computer-readable medium of claim 15, wherein the computing system is a NEBS system.

20. The computer-readable medium of claim 15, wherein the one or more fans comprise PWM fans.

* * * * *